(12) United States Patent
Heyward et al.

(10) Patent No.: US 6,579,061 B1
(45) Date of Patent: Jun. 17, 2003

(54) SELECTIVE STEP TURBINE NOZZLE

(75) Inventors: John Peter Heyward, Loveland, OH (US); Robert Ingram Ackerman, West Chester, OH (US); Gregory Alan White, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 16 days.

(21) Appl. No.: 09/916,352

(22) Filed: Jul. 27, 2001

(51) Int. Cl.[7] .................................................. F01D 9/04
(52) U.S. Cl. .................. 415/189; 415/209.2; 415/209.4; 29/889.22
(58) Field of Search ................................ 415/189, 191, 415/209.2, 209.3, 209.4, 210.1, 914; 29/889.22; 416/193 A, 248, 219 R, 220 R

(56) References Cited

U.S. PATENT DOCUMENTS

| | | | |
|---|---|---|---|
| 3,846,038 A | * 11/1974 | Carriere et al. | ......... 415/914 X |
| 4,135,857 A | 1/1979 | Pannone et al. | ......... 416/193 A |
| 5,020,970 A | * 6/1991 | Dussourd et al. | ....... 415/914 X |
| 6,158,961 A | * 12/2000 | Kehl et al. | .............. 416/193 A |
| 6,261,053 B1 | * 7/2001 | Anderson et al. | ........... 415/115 |
| 6,354,797 B1 | * 3/2002 | Heyward et al. | ........... 415/191 |

FOREIGN PATENT DOCUMENTS

| | | | | |
|---|---|---|---|---|
| EP | 902167 A1 | * 3/1999 | ........... F01D/25/12 |
| EP | 913556 | 5/1999 | | |
| GB | 2042675 A | * 9/1980 | ............. F01D/9/00 |
| JP | 58-162702 | 9/1983 | | |

* cited by examiner

*Primary Examiner*—Edward K. Look
*Assistant Examiner*—Richard A. Edgar
(74) *Attorney, Agent, or Firm*—Nathan D. Herkamp; Francis L. Conte

(57) ABSTRACT

A turbine nozzle includes segments of outer and inner bands supporting corresponding vane pairs. The bands adjoin each other at corresponding ends along splitlines, with each band having a forward land, an opposite aft land, and a middle land extending therebetween. The forward lands have a nominal aft-facing step, the aft lands have a nominal forward-facing step and the middle lands are nominally flush.

20 Claims, 5 Drawing Sheets

SELECTIVE STEP TURBINE NOZZLE

BACKGROUND OF THE INVENTION

The present invention relates generally to gas turbine engines, and, more specifically, to turbine nozzles therein.

In a gas turbine engine air is pressurized in a compressor and mixed with fuel in a combustor for generating hot combustion gases that flow downstream through a high pressure turbine nozzle which directs the flow into a row of high pressure turbine rotor blades. The blades extract energy from the gases for powering the compressor, and a low pressure turbine is disposed downstream therefrom for extracting additional energy which typically powers a fan for producing propulsion thrust to power an aircraft in flight.

The high pressure turbine nozzle receives the highest temperature combustion gases directly from the combustor and is specifically configured for withstanding those gases for a useful service life. The nozzle is an annular structure but is segmented into arcuate segments to accommodate the substantial expansion and contraction of the components thereof due to the hot operating environment. Each segment includes arcuate outer and inner bands supporting a pair of hollow stator vanes which receive a portion of pressurized air bled from the compressor for cooling the nozzle segments during operation.

The two bands define the radially outer and inner flowpath surfaces between which the combustion gases are confined during operation. The bands are separated from each other by corresponding axial splitlines which are suitably sealed with typical spline seals therebetween.

The nozzle vanes have a crescent profile with substantial curvature or camber between the leading and trailing edges thereof, with a generally concave pressure side and a generally convex opposite suction side along which the combustion gases flow during operation. The suction side of one vane is circumferentially spaced from the pressure side of an adjacent vane to define a flow channel therebetween for the combustion gases. The combustion gases enter these flow channels in a general axial downstream direction and are redirected at an oblique angle from the outlet of the channels defined between adjacent vane trailing edges.

Accordingly, the individual streamlines of the combustion gases flow generally parallel to each other between the nozzle vanes, but vary in curvature to correspond with the different velocities thereof as effected by the suction and pressure sides of adjacent vanes.

The band splitlines are straight and oriented obliquely in the bands between the corresponding arcuate profiles of the adjacent vane suction and pressure sides. Accordingly, the combustion gases typically cross the splitline twice during their passage between the vanes as they curve between the suction and pressure sides and flow axially aft along the splitlines.

The bands are circumferentially continuous between each pair of vanes in each nozzle segment and enjoy maximum aerodynamic efficiency. However, the splitlines between the vanes of adjacent nozzle segments provide a local discontinuity in the bands which can affect aerodynamic efficiency.

The band flow surfaces are designed to be substantially flush with each other at the splitlines, but due to normal manufacturing tolerances and stack-up of those tolerances during assembly of the nozzle components, differences in radial elevation of the adjoining bands randomly occur with corresponding steps in the flow path surfaces. If the step faces forwardly opposite to the direction of the combustion gases, they introduce a local obstacle to the smooth flow of those gases which both reduces aerodynamic efficiency of the nozzle and locally heats the exposed edges leading to oxidation thereof over time. Oxidation of the exposed splitline edges reduces the useful life of the nozzle segments and requires earlier replacement thereof than would be otherwise required.

Since the combustion gases typically cross the oblique splitlines twice as they pass through the nozzle channels, the undesirable flow-obstructing steps may occur at either the forward portion of the bands or the aft portion of the bands or may vary therebetween in a transition zone therebetween. Since a typical aircraft gas turbine engine operates over different power levels from idle to maximum power, the configuration of the streamlines through the nozzle correspondingly varies.

Accordingly, a downstream facing step during some operation of the engine may change to an upstream facing step as the configuration of the streamlines changes. Undesirable oxidation of the upstream facing edge remains a practical problem due to real-life manufacturing tolerances and the inability to exactly dimension the nozzle components. Nozzle durability is therefore affected by the exposed splitline edges which shortens the useful life of the nozzle in practice.

It is, therefore, desired to provide an improved turbine nozzle including an improved splitline configuration for enhancing durability and useful life of the nozzle.

BRIEF SUMMARY OF THE INVENTION

A turbine nozzle includes segments of outer and inner bands supporting corresponding vane pairs. The bands adjoin each other at corresponding ends along splitlines, with each band having a forward land, an opposite aft land, and a middle land extending therebetween. The forward lands have a nominal aft-facing step, the aft lands have a nominal forward-facing step and the middle lands are nominally flush.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
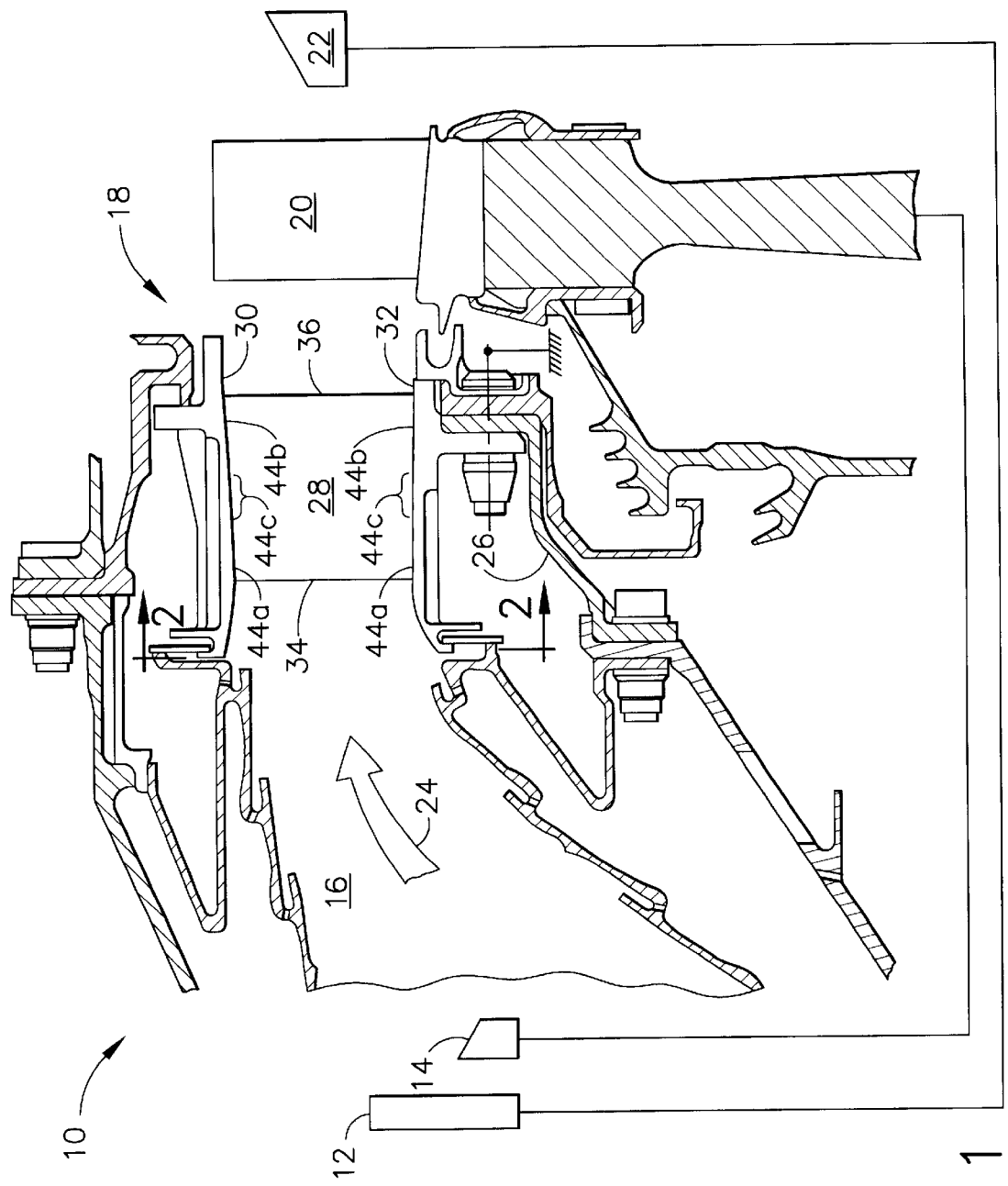
FIG. 1 is an axial sectional view of a portion of a turbofan aircraft gas turbine engine including a combustor discharging combustion gases to a high pressure turbine nozzle in accordance with an exemplary embodiment of the present invention.

Illustrated schematically in FIG. 1 is a gas turbine engine 10 in the exemplary form of a turbofan aircraft engine configured for powering an aircraft in flight. The engine includes in serial flow communication a fan 12, a multistage axial compressor 14, an annular combustor 16, a high pressure turbine nozzle 18, a high pressure turbine 20, and a low pressure turbine 22.

During operation, air is channeled through the fan and compressor and mixed with fuel in the combustor for generating hot combustion gases 24 which are discharged downstream through the high and low pressure turbine components. The high pressure turbine 20 includes a row of rotor blades which extract energy from the gases for powering the compressor in a conventional manner. Additional energy is extracted from the combustion gases in the rotor blades of the low pressure turbine which in turn powers the fan in a conventional manner.

The high pressure turbine nozzle 18 illustrated in FIG. 1 is an annular assembly of parts fixedly mounted coaxially in the engine on an annular support ring 26 specifically configured therefor, which is suitably attached to an inner casing of the engine. The nozzle includes a row of circumferentially adjacent nozzle segments 18a, illustrated in FIG. 2, which interrupt the circumferential continuity of the nozzle for reducing thermal stresses therein under expansion and contraction caused by the hot combustion gases.

Figure 2:
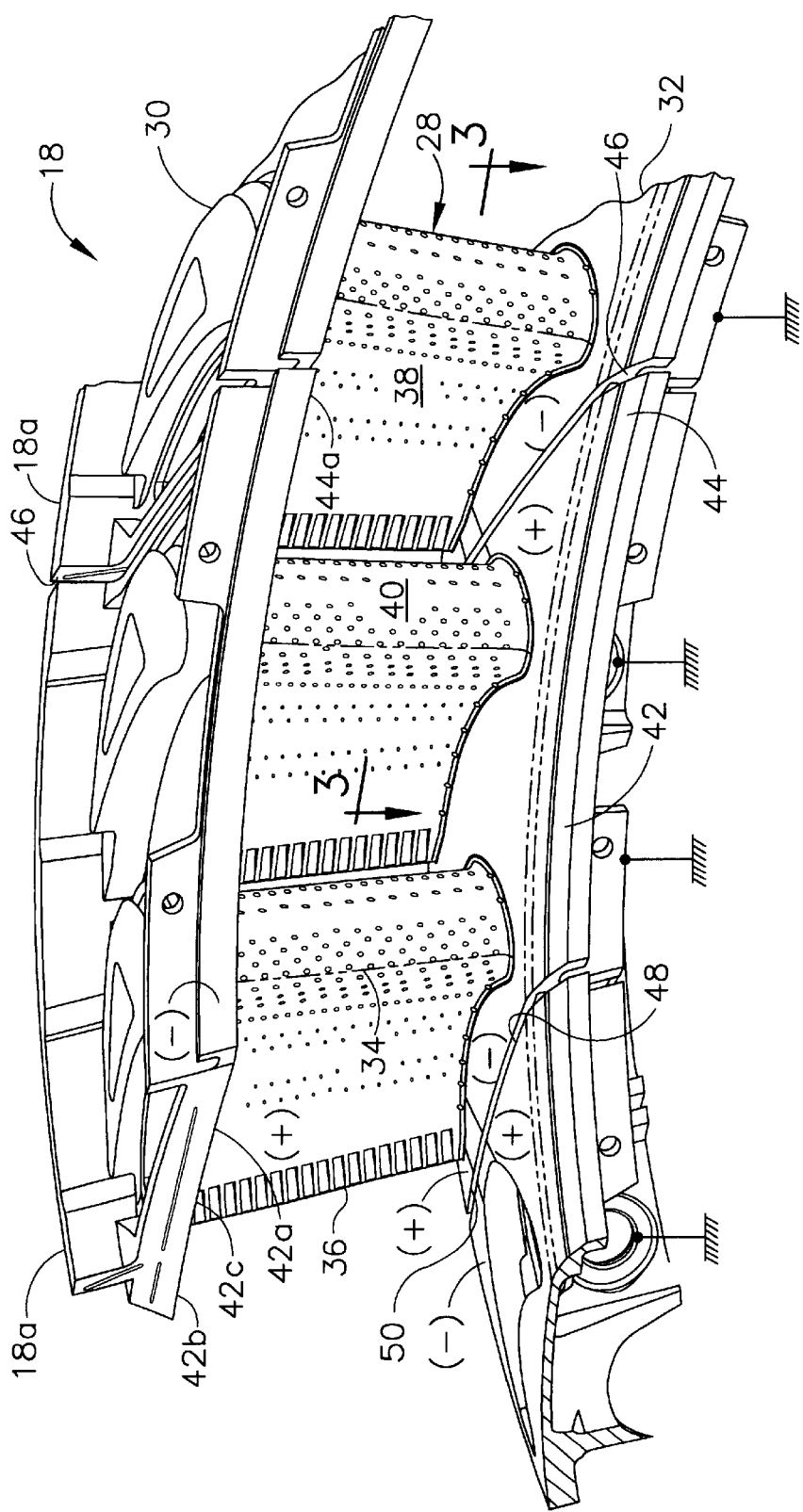
FIG. 2 is an isometric view of a portion of the turbine nozzle illustrated in FIG. 1.

As shown in FIG. 2, each of the nozzle segments includes a pair of stator vanes 28 fixedly mounted at opposite radial ends to corresponding arcuate outer and inner bands 30,32. Each of the vanes includes axially opposite leading and trailing edges 34,36 and circumferentially opposite pressure and suction sides 38,40 extending radially between opposite ends of the vanes which are fixedly mounted in corresponding apertures in the bands.

The vane pressure side 38 is generally concave, and the suction side is generally convex for channeling the combustion gases in the flow channels between adjacent vanes in a conventional manner for discharge into the turbine blades. The nozzle vanes are hollow and include various rows of film cooling holes through the walls thereof through which a portion of air bled from the compressor is channeled for cooling the nozzle segments during operation in a conventional manner.

Figure 3:
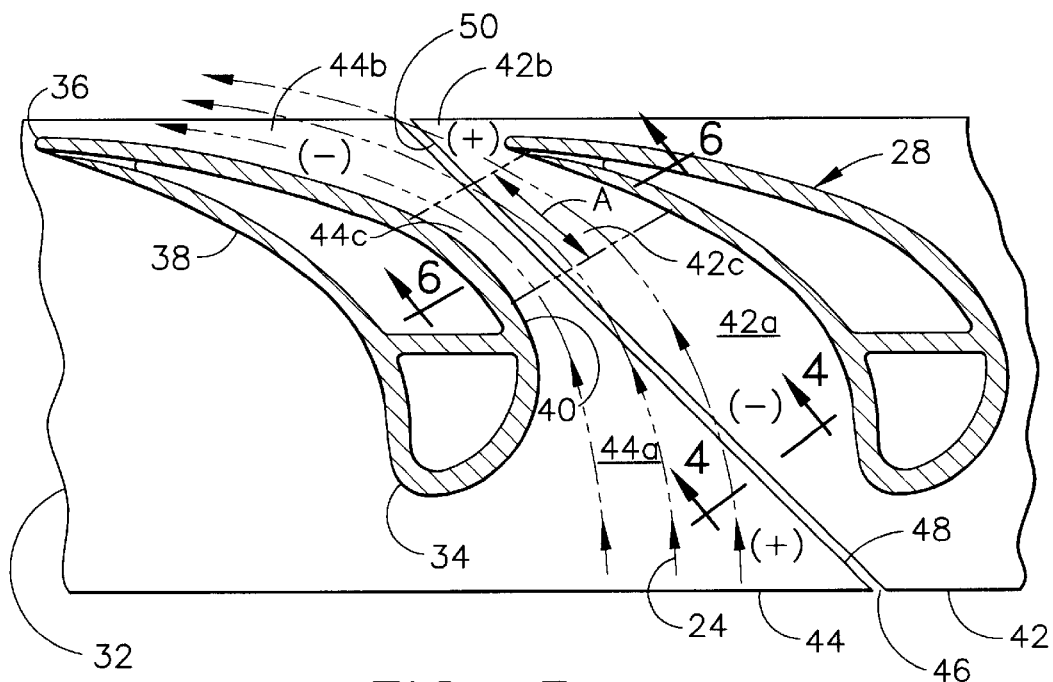
FIG. 3 is a radial section view of a portion of adjoining nozzle segments illustrated in FIG. 2 and taken along line 3—3.

As shown in FIGS. 2 and 3, each of the inner bands has circumferentially opposite first and second ends 42,44 which adjoin each other at respective axially extending splitlines 46. The inner band defines the inner flowpath boundary or surface of each nozzle segment with the outer band correspondingly defining the outer flowpath surface. Accordingly, the outer band also includes circumferentially opposite first and second ends like those in the inner band, and a corresponding splitline between adjacent ones of the outer bands.

As further described hereinbelow, the inner bands 32 are specifically configured at the splitlines for improving aerodynamic performance and reducing undesirable oxidation thereat. The outer bands may be similarly configured in the same manner at the splitlines therebetween as further described hereinbelow.

More specifically, the splitlines 46 in the outer and inner bands are required for reducing thermal stress in the nozzle during operation, but introduce discontinuities along the circumference of the nozzle. The band ends face each other at the corresponding splitlines and include hidden slots therein in which are disposed conventional spline seals that seal the adjoining ends of the nozzle segments in a conventional manner.

As indicated above, due to manufacturing tolerances and stack-up of those tolerances during the assembly of the nozzle components, the junction of the nozzle bands at the corresponding splitlines can randomly have undesirable upstream facing steps which locally block the downstream flow of the combustion gases and is subject to local heating and oxidation which would decrease nozzle efficiency and useful life in service.

However, the band joints at the corresponding splitlines are specifically configured in accordance with the present invention for reducing or eliminating the random effect of upstream facing steps for improving efficiency of the nozzle, decreasing oxidation at the splitlines, and increasing useful service life.

More specifically, and initially referring to FIG. 3, each of the band ends has a forward land 42a,44a extending aft from the front edge of the band along the splitline near the vane leading edge, and an aft land 42b,44b extending forward from the aft end of the band along the splitline near the vane trailing edge. And, each band end also includes a middle land 42c,44c extending along the splitline over an intermediate portion of the vane between the respective forward and aft lands to collectively form flowpath surfaces which radially bound the combustion gas flow between the vanes.

In accordance with the present invention, the forward lands 42a,44a adjoining at the respective splitlines 46 have a nominal aft-facing step 48, and the aft lands 42b,44b adjoining at the same splitlines have a nominal forward-facing step 50. And, most significantly, the middle lands 42c,44c adjoining at the same splitlines are nominally flush with each other, with no step nominally therebetween.

As indicated above, the manufacture of turbine components is subject to random variation in all dimensions, since perfect or exact dimensions are impossible to achieve. As indicated below, the various components of the turbine nozzle are initially cast, assembled together, and brazed in two-vane nozzle segments which are assembled together in the annular nozzle itself supported by axial bolts through the annular support 26 illustrated in FIG. 1.

The final radial position of the flowpath surfaces of the inner and outer bands is determined by the manufacturing tolerances of the bands themselves, the assembly tolerances when joined to the vanes, and the additional assembly tolerances when mounted to the annular support 26. These various tolerances randomly add together in the finally assembled turbine nozzle, with the inner and outer bands being radially aligned with each other within an acceptable dimensional tolerance range suitably greater than and less than a nominal value representing a desired final dimensional position of the band flowpath surfaces.

In the fabrication and assembly of conventional turbine nozzle components, the radial position of the flowpath surfaces of the inner and outer bands at the splitlines may be obtained within a dimensional tolerance of about plus or minus twenty (+/−20) mils. For a conventional turbine nozzle in which the band ends are designed for a nominally flush final position, random variation in the dimensional tolerance can lead to substantial forward or aft facing steps which locally obstruct the combustion gas flow, are locally heated thereby, and are subject to oxidation reducing the useful life of the turbine nozzle.

Figure 4:
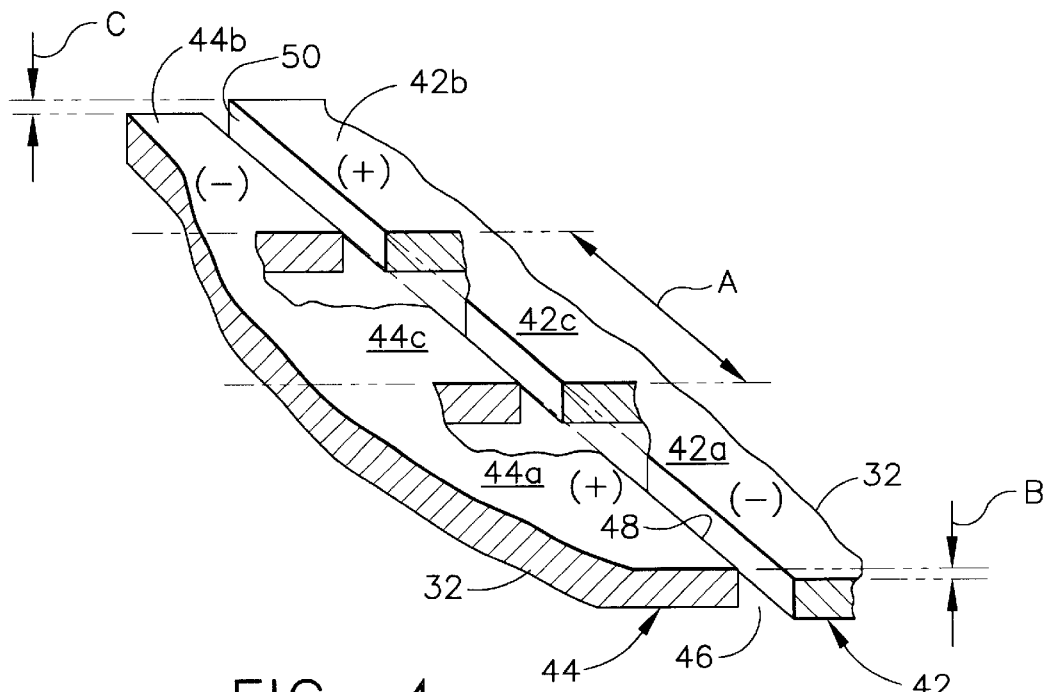
FIG. 4 is a sectional view of a portion of adjoining inner bands of the nozzle segments illustrated in FIG. 3 and taken generally along line 4—4.

However, and in accordance with the present invention, the selectively introduced aft-facing steps 48 at the forward lands ensure downstream flow of the combustion gases without impingement against an outwardly protruding band edge. This is illustrated in FIGS. 3 and 4 in which the downstream flowing combustion gases 24 flow over the forward lands 44a of the left illustrated band and drop to the relatively lower forward land 42a on the right band.

Similarly, the forward-facing steps 50 at the aft lands 42b,44b ensure that as the combustion gases change direction between the adjacent vanes over the splitline, they again drop from the aft land 42b of the right band to the lower aft land 42b on the left band illustrated.

The middle lands 42c,44c represent a transition zone between the forward and aft lands in which the streamlines of the combustion gas flow generally parallel with the splitline and undergo a change in direction between the adjacent bands.

As best shown in FIG. 3, the splitlines 46 are disposed obliquely between the adjacent nozzle segments, with the corresponding band ends 42,44 also being oblique for positioning the splitline generally uniformly between the obliquely oriented nozzle vanes. This oblique orientation is conventional for redirecting the combustion gases which enter the nozzle flowpath channels generally axially, and discharging the combustion gases in a substantial tangential direction for engaging the downstream rotor blades. In this configuration, the forward lands 42a,44a illustrated in FIG. 3 are longer along the splitline than each of the middle and aft lands 42c,44c and 42b,44b.

With this oblique configuration of the splitlines 46, the combustion gases must necessarily flow over the forward portion thereof from one band to the next, and then again flow in an opposite direction over the splitline back to the initial band as the combustion gases are discharged from the nozzle outlet. Accordingly, the combustion gas streamlines transition between these two directions, which transition preferably occurs in the middle lands 42c,44c.

The middle lands are therefore predeterminedly sized in length A along a limited portion of the splitlines to preferably prevent streamlines of the combustion gases from flowing into the aft-facing steps 48 at the forward lands, and from flowing into the forward-facing steps 50 over a preferred operating range of the engine, such as cruise power and extending down to idle or up to maximum power as desired. The middle lands therefore have a finite length A and are not merely a singular point in the transition between the forward and aft facing steps to ensure that the combustion gases do not flow upstream over the deliberately introduced forward and aft facing steps.

For example, if the middle lands were eliminated, with the aft and forward lands joining each other near the middle of the splitlines, it would be possible for some of the streamlines flowing along the right band past the vane leading edges illustrated in FIG. 3 to engage the aft-facing steps as they turn early over the splitlines. Alternatively, it would also be possible for some of the streamlines from the left band to engage a portion of the forward-facing step due to late turning of the streamlines over the splitlines.

The introduction of the middle lands being substantially flush with each other reduces the likelihood that early or late flow turning between the vanes will flow upstream over the forward and aft facing steps instead of downstream thereover.

In the preferred embodiment illustrated in FIGS. 3 and 4, the forward and aft lands preferably blend smoothly with the corresponding middle lands for blending both the aft-facing steps 48 and the forward-facing steps 50 with the nominally flush or no step portion of the splitlines effected by the middle lands.

As shown schematically in FIG. 4, the forward land 44a of the left band is disposed at a higher elevation (+) relative to the forward land 42a of the right band (−) with the difference in elevation thereof representing the height B of the forward-facing step 48. Similarly, the aft land 42b of the right band is at a higher elevation (+) relative to the aft land 44b of the left band (−) as represented by the difference in relative elevation defining the height C of the forward-facing step 50.

The two step heights B,C preferably decrease in magnitude from the opposite forward and aft ends of the bands toward the middle lands therebetween with which the forward and aft lands blend to a substantially zero difference in elevation for providing the nominally flush alignment therebetween.

In the exemplary embodiment illustrated in FIG. 3, the middle lands 42c,44c are disposed closer to the vane trailing edges than the leading edges along the pressure sides 38 of the vanes. And, the middle lands are also disposed closer to the vane leading edges than the trailing edges along the corresponding suction sides 40 of the vanes. In view of the different aerodynamic effects of the pressure and suction sides of the vanes, the transition region in which the combustion gas streamlines change direction for recrossing the splitlines occurs near the vane trailing edge on the pressure side of one vane and near the intermediate hump region on the suction side of the opposite vane. The middle lands are therefore preferably located and sized for covering this transition region for any suitable operating range of the engine.

The introduction of the forward lands and aft-facing steps 48, flush middle lands, and aft lands with forward-facing steps 50 is preferred in the inner bands 32, or in the outer bands 30, and is preferably found in both the outer and inner bands.

In view of the random nature of final position of the flowpath surfaces at the splitlines due to manufacturing tolerances and assembly stack-up thereof, the introduction of the three discrete forward, aft, and middle lands along the splitlines may be used to advantage for decreasing the likelihood and extent of a splitline edge protruding into a portion of the combustion gas flow which would locally increase the temperature thereof and lead to excessive oxidation reducing nozzle life.

By deliberately and selectively introducing the aft-facing and forward-facing steps 48,50 with the nominally flush middle lands therebetween, oxidation of the splitline edges may be reduced for increasing nozzle durability and service life. This advantage may be achieved with normal manufacturing tolerances.

However, in accordance with another feature of the present invention, the middle lands 42c,44c are preferably manufactured with a smaller manufacturing tolerance in radial position of the flowpath surfaces thereof than the manufacturing tolerance for the forward and aft lands along the splitline. In this way, improved flushness of the adjoining middle lands may be effected for further reducing the likelihood and magnitude of any step introduced therebetween in practice.

Figure 5:
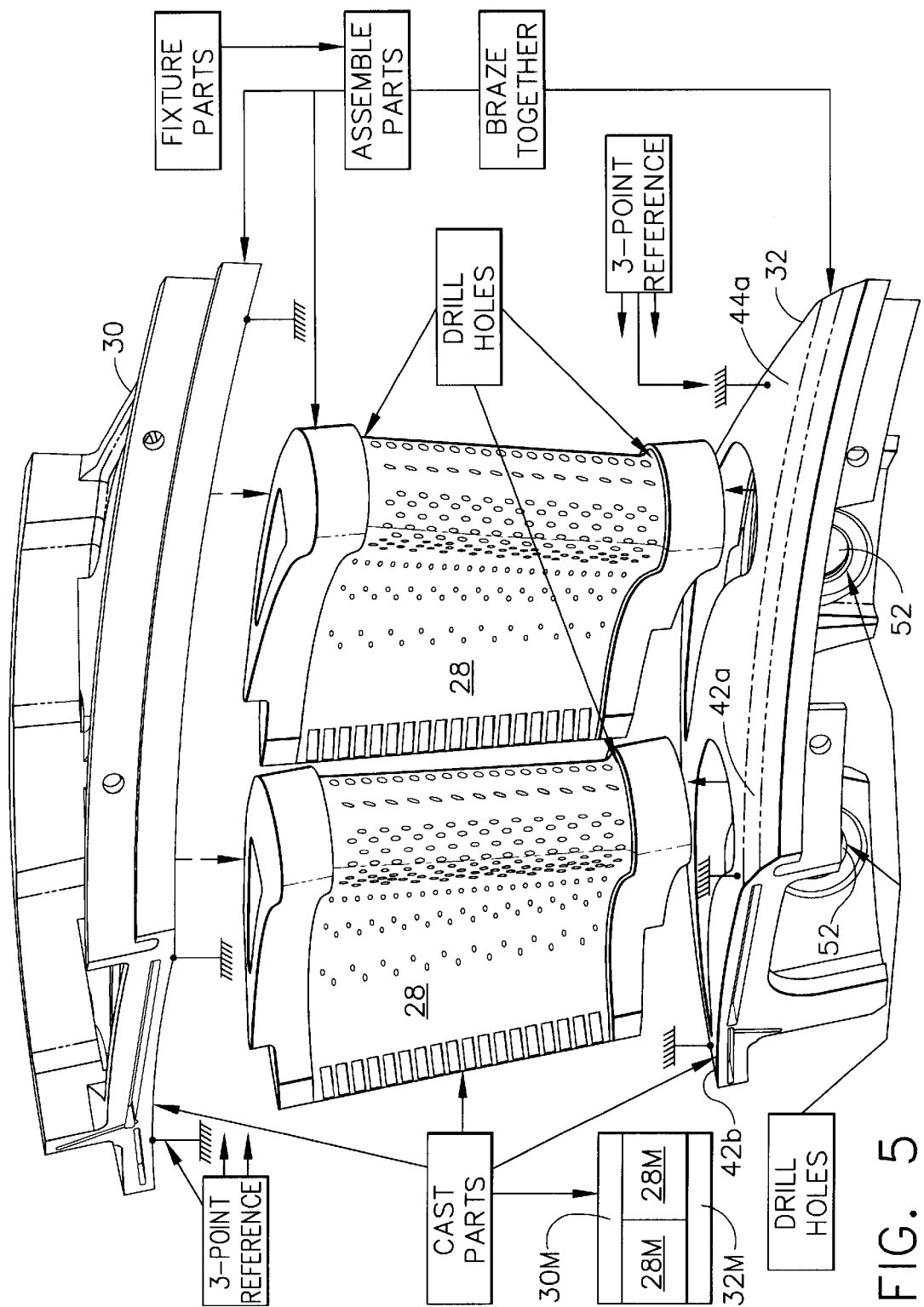
FIG. 5 is an exploded view of an exemplary one of the nozzle segments illustrated in FIG. 2 in conjunction with a flowchart representation of the manufacture thereof in accordance with an exemplary embodiment of the present invention.

FIG. 5 illustrates schematically a preferred method of making the individual nozzle segments which collectively form the annular turbine nozzle. The individual nozzle vanes 28 and outer and inner bands 30,32 are separately cast using master or metal dies or molds 28M,30M, and 32M. These molding dies are used in a conventional manner of casting using the lost wax method.

In this method, the molding dies are complementary with the external surfaces of the vanes and bands and are initially filled with wax. The wax is solidified, removed from the dies, and then coated with ceramic to form a molding shell. The wax is removed from the shell and replaced by molten metal which forms the corresponding parts. Since the vanes are preferably hollow, conventional ceramic cores are used in conjunction with the ceramic shells for casting the vanes in any conventional manner.

The cast vanes and bands are then assembled together by inserting the corresponding opposite hub ends of the vanes into corresponding seats in the bands, and temporarily held together in suitable fixtures therefor.

The vane hubs are then brazed into their corresponding seats in the bands for fixedly bonding together the two cast vanes and two bands in a four-part assembly for each nozzle segment. Each nozzle segment is then further processed by drilling the various rows of film cooling holes in the vanes and other required features for completing a full row of nozzle segments defining the completed turbine nozzle.

In a preferred embodiment, a pair of the nozzle segments are manufactured in this manner using the same master dies for the vanes and bands, and then the two nozzle segments are assembled together in a suitable fixture, or on the intended annular support 26 illustrated in FIG. 1, for achieving the intended relative position thereof in the turbine nozzle.

In conventional casting of turbine nozzle parts, the master dies are configured for the nominal dimensions of the corresponding vane and band parts, and are therefore subject to random variations in dimensions, which are substantial in cast parts as compared with machined parts which may have closer or smaller variation in tolerances. The nominal casting of the nozzle parts and stack-up tolerances thereof during assembly will typically result in a random variation in relative elevation between the adjoining middle lands 42c,44c as illustrated schematically in FIG. 6.

As a result thereof, the desired flushness of the adjacent middle lands may vary within a corresponding tolerance range, with the initial introduction of a locally small middle step having a magnitude D. That middle step D is measured while the two adjacent nozzle segments are suitably fixtured in relative position. And then, another pair of the nozzle segments are preferably re-cast to reduce the measured step D to achieve the desired nominal flush alignment of the middle lands.

Figure 6:
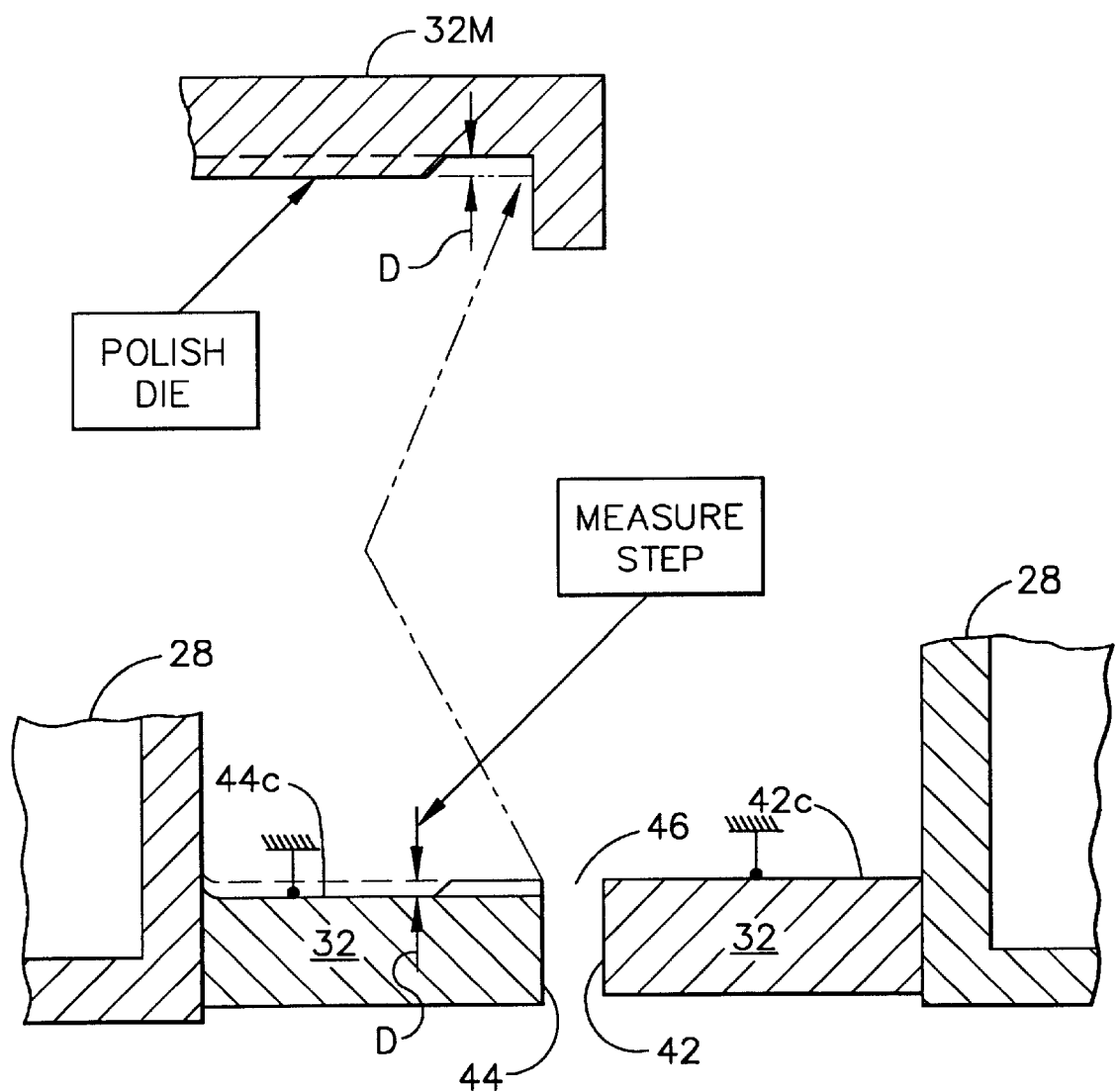
FIG. 6 is a radial section view through the adjoining nozzle segments illustrated in FIG. 3 and taken generally along line 6—6.

More specifically, the relevant portion of the molding die 32M for the inner band 32 is illustrated in FIG. 6 which is preferably locally polished to remove material therefrom which will correspondingly locally increase thickness of the corresponding middle land 44c when the next band is cast using the polished die. In this way, the initial step D measured between the two middle lands 42c,44c may be substantially reduced or eliminated in subsequent castings by correspondingly polishing the respective portion of the molding die therefor.

The casting of sample nozzle segments, assembly thereof, measuring of any difference in elevation between the middle lands, locally polishing the band dies, and re-casting a new set of nozzle segments may be done one or more times as desired for reducing or substantially eliminating the magnitude of the initial middle step D. The resulting inner bands will therefore have different thicknesses at the splitline to effect the nominal flush alignment therebetween. As shown in FIG. 6, a portion of the left middle land 44c is illustrated in phantom line with its initial step D, which step is substantially eliminated as shown in solid line by the local polishing of the corresponding die 32M which will locally introduce additional material in the cast band.

Since the splitline 46 is defined between opposite portions of the middle lands 42c,44c on adjacent inner bands, one of those portions will remain with its original thickness as initially cast, with the other portion being locally thickened to substantially eliminate any surface step therebetween. In this way, the relative degree of flushness between the middle lands of adjoining bands may be substantially improved over conventional casting in which the dies are not so polished. For example, the conventional manufacturing tolerance of about +/−20 mils on the radial position of the band flowpath surfaces may be substantially reduced to about plus or minus six (+/−6) mils in the method described above.

As indicated above the three-land configuration along the splitlines is preferably introduced for both the inner and outer bands, and correspondingly the molding dies therefor may be similarly locally polished as required for achieving the desired flushness in the middle lands between the adjoining inner and outer bands at which the corresponding aft and forward facing steps blend.

As illustrated schematically in FIG. 5, the cast outer and inner bands 30,32 are preferably fixtured or physically grounded at three reference points each on the corresponding flow surfaces thereof. This three-point fixturing ensures accurate alignment of the bands so that the vanes 28 may be accurately brazed in the fixtured bands.

In the preferred embodiment illustrated in FIG. 5, the corresponding outer and inner bands 30,32 are fixtured at three points corresponding with the forward and aft lands 42a,b at one end thereof and the forward land 44a at an opposite end thereof. In this way the relative radial position of the flowpath surfaces at the adjoining splitlines may be more accurately achieved for the nominally flush middle lands and stepped forward and aft lands.

Furthermore, with the brazed nozzle segments being so fixtured at three points, two corresponding mounting holes 52 may be accurately drilled in the radial support flange extending inwardly from the inner band. In this way, when the nozzle segments are bolted to the annular support 26 illustrated in FIG. 1, precise alignment of the adjoining inner bands and the adjoining outer bands may be effected with the desired stepped forward and aft lands and nominally flush middle lands therebetween.

Notwithstanding conventional manufacturing tolerances and buildup thereof as described above, the adjoining inner and outer bands of the nozzle segments may be preferentially configured with the aft-facing steps at the forward lands, forward-facing steps at the aft lands, and the substantially flush middle lands therebetween for maximizing aerodynamic efficiency of the turbine nozzle without locally obstructing flow of the combustion gases due to protruding splitline edges. The splitline edges are protected from the combustion gases and are not additionally heated thereby and oxidized as they would if protruding into the combustion gas flow. Durability of the turbine nozzle is therefore improved for correspondingly improving the useful life thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:

a row of nozzle segments each including a pair of vanes mounted at opposite ends to outer and inner bands;

each of said vanes having axially opposite leading and trailing edges and circumferentially opposite pressure and suction sides extending radially between said opposite ends;

each of said bands having circumferentially opposite first and second ends adjoining at respective splitlines therebetween;

each of said band ends having a forward land extending along said splitline near said vane leading edge, an aft land extending along said splitline near said vane trailing edge, and a middle land extending along said splitline over an intermediate portion of said vane between said forward and aft lands to collectively form flowpath surfaces bounding combustion gas flow between said vanes; and said forward lands at said splitlines having a nominal aft-facing step, said aft lands at said splitlines having a nominal forward-facing step and said middle lands being nominally flush.

2. A nozzle according to claim 1 wherein said forward and aft lands blend with said middle lands for blending said aft-facing steps and forward-facing steps with said nominally flush middle lands.

3. A nozzle according to claim 2 wherein said middle lands are sized in length along said splitlines to prevent streamlines of combustion gases from flowing into said aft-facing steps at said forward lands, and from flowing into said forward-facing steps at said aft lands.

4. A nozzle according to claim 2 wherein said middle lands are disposed closer to said vane trailing edges than said leading edges along said pressure sides, and closer to said vane leading edges than said trailing edges along said suction sides.

5. A nozzle according to claim 4 wherein said aft-step forward lands, middle lands, and forward-step aft lands are disposed in said inner bands.

6. A nozzle according to claim 4 wherein said aft-step forward lands, middle lands, and forward-step aft lands are disposed in said outer bands.

7. A nozzle according to claim 4 wherein said aft-step forward lands, middle lands, and forward-step aft lands are disposed in both said outer and inner bands.

8. A nozzle according to claim 4 wherein said bands at said middle lands have different thicknesses to effect said nominally flush alignment therebetween.

9. A nozzle according to claim 4 wherein said middle lands have a smaller manufacturing tolerance in radial position than said forward and aft lands at said splitlines.

10. A method of making said nozzle according to claim 1 comprising:

casting separately said vanes and bands;

bonding together said cast vanes and bands in a pair of said nozzle segments;

assembling together said pair of nozzle segments;

measuring any step between said middle lands; and re-casting another pair of said nozzle segments to reduce said measured step to said nominal flush alignment at said middle lands.

11. A method according to claim 10 further comprising:

casting said vanes and bands from corresponding dies therefor;

locally polishing one of said band dies to remove material therefrom for locally increasing thickness of a corresponding one of said middle lands to reduce said measured step; and re-casting said segments using said polished band die to reduce said measured step.

12. A method according to claim 11 further comprising:

fixturing said cast outer and inner bands at three points each on flow surfaces thereof; and bonding together said vanes in said fixtured bands.

13. A method according to claim 12 wherein said bands are fixtured at three points corresponding with said forward and aft lands at one end thereof and said forward land at an opposite end thereof.

14. A turbine nozzle comprising:

a row of nozzle segments each including a pair of vanes mounted at opposite ends to outer and inner bands;

each of said vanes having axially opposite leading and trailing edges and circumferentially opposite pressure and suction sides extending radially between said opposite ends;

each of said bands having circumferentially opposite first and second ends adjoining at respective splitlines therebetween;

each of said band ends having a forward land extending along said splitline near said vane leading edge, an aft land extending along said splitline near said vane trailing edge, and a middle land extending along said splitline over an intermediate portion of said vane between said forward and aft lands to collectively form flowpath surfaces bounding combustion gas flow between said vanes;

said forward lands at said splitlines having a nominal aft-facing step, said aft lands at said splitlines having a nominal forward-facing step and said middle lands being nominal flush; and said middle lands have a smaller manufacturing tolerance in radial position than said forward and aft lands at said splitlines.

15. A nozzle according to claim 14 wherein said bands at said middle lands have different thicknesses to effect said nominally flush alignment therebetween.

16. A nozzle according to claim 15 wherein said forward and aft lands blend with said middle lands for blending said aft-facing steps and forward-facing steps with said nominally flush middle lands.

17. A nozzle according to claim 16 wherein said middle lands are disposed closer to said vane trailing edges than said leading edges along said pressure sides, and closer to said vane leading edges than said trailing edges along said suction sides.

18. A nozzle according to claim 17 wherein said aft-step forward lands, middle lands, and forward-step aft lands are disposed in both said outer and inner bands.

19. A nozzle according to claim 18 wherein said middle lands are sized in length along said splitlines to prevent streamlines of combustion gases from flowing into said aft-facing steps at said forward lands, and from flowing into said forward-facing steps at said aft lands.

20. A nozzle according to claim 19 wherein said splitlines are disposed obliquely between said segments, and said forward lands are longer than each of said middle and aft lands along said splitlines.

* * * * *